United States Patent
Blume

(10) Patent No.: US 7,168,440 B1
(45) Date of Patent: Jan. 30, 2007

(54) VALVE BODY AND SEAL ASSEMBLY

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 0 days.

(21) Appl. No.: 11/148,081

(22) Filed: Jun. 8, 2005

Related U.S. Application Data

(63) Continuation-in-part of application No. 10/179,804, filed on Jun. 25, 2002, now Pat. No. 6,955,181.

(51) Int. Cl.
 F16K 15/06 (2006.01)
(52) U.S. Cl. .............. 137/15.18; 137/375; 137/516.29; 137/902; 251/332; 251/368
(58) Field of Classification Search ............. 137/15.18, 137/15.19, 315.27, 516.29, 543.23, 902, 137/375; 251/332; 29/888.3, 890.127; 277/316, 277/922
See application file for complete search history.

(56) References Cited

U.S. PATENT DOCUMENTS

| | | | | |
|---|---|---|---|---|
| 3,070,120 A | * | 12/1962 | Wendt | 137/516.29 |
| 3,090,596 A | * | 5/1963 | Gifford | 251/333 |
| 4,860,995 A | * | 8/1989 | Rogers | 251/356 |
| 5,275,204 A | * | 1/1994 | Rogers et al. | 137/516.29 |

* cited by examiner

Primary Examiner—Ramesh Krishnmaurthy
(74) Attorney, Agent, or Firm—Dennis W. Gilstad

(57) ABSTRACT

A valve body and seal assembly comprising a top-stem-guided valve body having at least one cast-in-place elastomeric seal insert in a peripheral seal retention groove and a cast-in-place top guide stem sleeve is made by pouring and curing liquid elastomer in at least one mold comprising the peripheral seal retention groove and the top guide stem. Mold surfaces contacting the poured elastomer are adhesion-inhibiting surfaces which reduce or eliminate background elastomer stress due to shrinkage during curing of the elastomer, and which allow limited relative movement of cast-in-place elastomer with respect to the valve body. Serrations on each of the opposing walls of the seal retention groove are offset to moderate differing stress concentrations in the groove walls.

19 Claims, 15 Drawing Sheets

Typical Fluid Section

Triplex Fluid Section Housing

Web Seat & Stem Guided Valve Body

VALVE BODY AND SEAL ASSEMBLY

This is a continuation-in-part (CIP) patent application of U.S. Ser. No. 10/179,804 (hereinafter the '804 application), which was filed Jun. 25, 2002 now U.S. Pat. No. 6,955,181.

FIELD OF THE INVENTION

The present invention relates generally to valves suitable for rapid open-close cycling with abrasive fluids, such as drilling mud, under high pressures. More specifically, the invention relates to valves comprising a peripheral elastomeric seal and at least one elastomeric guide stem sheath on the moving element of the valve.

BACKGROUND OF THE INVENTION

Engineers typically design high-pressure oil field plunger pumps in two sections; the (proximal) power section and the (distal) fluid section. The power section usually comprises a crankshaft, reduction gears, bearings, connecting rods, crossheads, crosshead extension rods, etc. Commonly used fluid sections usually comprise a plunger pump housing having a suction valve in a suction bore, a discharge valve in a discharge bore, an access bore, and a plunger in a plunger bore, plus high-pressure seals, retainers, etc. FIG. 1 is a cross-sectional schematic view of a typical fluid section showing its connection to a power section by stay rods. A plurality of fluid sections similar to that illustrated in FIG. 1 may be combined, as suggested in the Triplex fluid section housing schematically illustrated in FIG. 2.

Valve terminology varies according to the industry (e.g., pipeline or oil field service) in which the valve is used. In some applications, the term "valve" means just the moving element or valve body. In the present application, however, the term "valve" includes not only a valve body but also one or more valve guides to control the motion of the valve body, a valve seat, and a valve spring and spring retainer that tend to hold the valve closed (i.e., with the valve body reversibly sealed against the valve seat). Stem-guided valve bodies typically comprise a lower guide stem and/or a top guide stem and at least one peripheral seal retention groove for incorporating an elastomeric seal.

FIG. 3 schematically illustrates a cross-section of a web valve seat and a stem-guided valve body incorporating an elastomeric seal insert within a peripheral seal retention groove. Web-seat, stem-guided designs have been proposed in the past to withstand the high pressures and repetitive impact loading typical of oil field service. Elastomeric seal tearing or cracking, as schematically illustrated in FIG. 3, extrusion of elastomer into the extrusion gap, and excessive wear of lower and/or top valve stem guides are among the common failure modes of these valves.

In particular, excessive valve stem guide wear is a possible failure mode of valves having top-stem-guided valve bodies such as discharge valve body 701 shown in FIGS. 4A and 4B. Such valves are schematically illustrated in copending patent application Ser. No. 11/125,282, which is incorporated herein by reference. FIG. 5 is a partial cross-section schematically illustrating discharge valve body 701 in its closed position (i.e., with peripheral elastomeric seal 703 held in symmetrical contact with valve seat 705 by discharge valve spring 707). Note that top guide stem 709 of discharge valve body 701 is aligned in close sliding contact with top valve stem guide 711.

FIG. 6 schematically illustrates how misalignment of top guide stem 709 is possible with excessive wear of top valve stem guide 711. Such excessive wear can occur because discharge valve body 701, including top guide stem 709, is typically made of steel that has been carburized to a hardness of about 60 Rockwell C. In contrast, the wall of top valve stem guide 711, which is shown in FIG. 6 as being formed within discharge bore plug 713, is typically made of mild alloy steel with a hardness of about 30 Rockwell C. Thus the softer wall of stem guide 711 is worn away by sliding contact with the harder guide stem 709. This wear is accelerated by side loads on valve body 701 that result when fluid flowing past the valve body changes its direction of flow into the discharge manifold. Analogous side loads would be present on a suction valve when fluid flowing past the valve body changes its direction of flow into the plunger cavity.

Eventually, top valve stem guide 711 can be worn sufficiently to allow discharge valve leakage due to significant asymmetric contact of elastomeric seal 703 with valve seat 705 as schematically illustrated in FIG. 7. This problem of stem guide wear is typically addressed in practice through use of a replaceable bushing 715 having a modified top valve stem guide 711' (see the schematic illustration in FIG. 8). Bushing 715 is commonly made of a plastic such as urethane, or a wear and corrosion-resistant metal such as bronze. Such bushings require periodic checking and replacement, but these steps may be overlooked by pump mechanics until a valve fails prematurely. Hence, it has been proposed to replace the carburized steel top guide stem 709, as well as peripheral seal 703, with a guide stem and seal comprising one or more relatively resilient and substantially non-metallic materials having a relatively low specific gravity. See, e.g., U.S. Pat. No. 4,860,995 (hereinafter the '995 patent) wherein a plastic or plastic-like insert is described as being distorted sufficiently to engage and then be mechanically locked, or alternatively bonded, (or both mechanically locked and bonded) to the body portion of a valve element (see col 3, lines 54–68 and col 7, lines 39–57).

If preformed seal inserts are to be distorted and mechanically locked to a valve body as in the '995 patent, the valve body requires finish machining to closely match the dimensions of the seals. Manufacturers recognized that this finish machining could be reduced or eliminated if elastomeric seals were cast and cured in place on the valve body (hereinafter "cast-in-place"). But savings in machining costs were often offset in practice by added costs associated with adhesive bonding of the cast-in-place seal inserts to a valve element in an attempt to increase overall valve body integrity (see the '995 patent, col 7, lines 47–50). The added costs of adhesive bonding, including removal of all oil and contaminants, application of a bonding adhesive, and storage of the valve bodies in a low-humidity, dust-free environment while awaiting the casting, bonding, and curing of the seal insert increased the cost of such valves to the point that they were not competitive on price. Further, as shown in FIG. 3, the elastomer of such cast-in-place seal inserts was subject to cracking or tearing where it was adhesively bonded to a peripheral valve body groove.

SUMMARY OF THE INVENTION

The present invention addresses both the problem of premature valve failures due to tearing or cracking of an elastomeric cast-in-place seal insert and the problem of excessive wear of valve stem guides. The problem of excessive wear of valve stem guides applies particularly to applications of top-stem-guided valve bodies because of the absence of the stabilizing influence of a lower guide stem.

By allowing limited relative movement between a valve body and the elastomers of seal inserts and guide stem sleeves cast-in-place on the valve body, background and dynamic elastomer stresses are reduced. The amount of such limited relative movement (e.g., in a range of about 2% to 4% of elastomer thickness in the direction of movement) is an inverse function of the modulus of elasticity for each elastomer selected and an inverse function of any adhesion between each elastomer and the valve body. Note however that an elastomer's microstructure (and physical properties such as modulus of elasticity, strengths and stiffnesses) may not be fixed but may instead be functions of the stresses to which the elastomer has been exposed (e.g., mechanical, thermal and/or chemical stress). Thus, appropriate choice of elastomer(s), together with moderation of elastomer stress through inhibition of adhesion between elastomer(s) and a valve body on which they are cast-in-place, results in a relatively longer valve service life with relatively stable elastomer properties. This relative elastomer stability is achieved because the limited relative movement of the present invention facilitates dispersion of forces acting on a valve body through the elastomer, with consequent reduction of peak contact pressures, dissipation of impact energy, and moderation of dynamic stress (including hysteresis-induced heat buildup) within the elastomer(s).

The present invention includes methods of making a valve body and seal assembly, and valve body and seal assemblies made by such methods, in which each cast-in-place elastomer experiences relatively lower stress due to limited relative movement between the valve body and the elastomer(s). One such method comprises providing a liquid elastomer (comprising, for example, MDI urethane) and a valve body on which the elastomer is cast-in-place. The valve body has a longitudinal axis and comprises a peripheral seal retention groove spaced apart from the longitudinal axis. The seal retention groove has first and second opposing sides, the opposing sides being separated by a groove width. A top guide stem extends away from the peripheral seal retention groove along the longitudinal axis, and an impact area of the valve body for contacting a valve seat is proximate to the first opposing side of the peripheral seal retention groove. There are circular serrations on the first and second opposing sides of the peripheral seal retention groove, these serrations being offset in the illustrated embodiments.

The above methods include treating the peripheral seal retention groove and the top guide stem as described herein to render them adhesion-inhibiting. In one illustrated embodiment, a mold is provided for containing the liquid elastomer, the mold comprising a mold shell mated with the valve body. The mold in this embodiment comprises the adhesion-inhibiting peripheral seal retention groove and the adhesion-inhibiting top guide stem. The liquid elastomer is poured into the mold and cured in the mold, after which the mold shell is removed from the valve body to make a valve body and seal assembly.

In an alternative illustrated embodiment, first and second molds are provided for containing the liquid elastomer, the first and second molds comprising, respectively, an adhesion-inhibiting first mold shell mated with the valve body and an adhesion-inhibiting second mold shell mated with the valve body. The first mold is for a cast-in-place elastomeric seal insert in a peripheral seal retention groove and comprises the first mold shell and the valve body's adhesion-inhibiting peripheral seal retention groove. The second mold is for a cast-in-place elastomeric top guide stem sleeve and comprises the second mold shell and at least a portion of the adhesion-inhibiting top guide stem. First and second liquid elastomers (which may be the same or different) are poured into the first and second molds respectively and cured in these molds, after which the first and second mold shells are removed from the valve body to make a valve body and seal assembly. In a modification of this method, the first and second molds are combined into one mold comprising a mold shell mated with the valve body. This combined mold is for both an elastomeric seal insert in a peripheral seal retention groove and an elastomeric top guide stem sleeve and comprises both the adhesion-inhibiting peripheral seal retention groove and at least a portion of the adhesion-inhibiting top guide stem. A liquid elastomer is poured into and cured within the combined mold, after which the mold shell is removed from the valve body to make a valve body and seal assembly.

The present invention also includes methods of securing an elastomeric seal insert and a top guide stem sleeve on a valve body that comprises a top guide stem and a peripheral seal retention groove having first and second opposing sides. One such method comprises providing circular serrations on the first and second opposing groove sides and providing a mold for making an elastomeric seal insert and a top guide stem sleeve, the mold comprising the peripheral seal retention groove and at least a portion of the top guide stem. The next step is choosing a castable elastomer that will not adhere to the mold, followed by casting and curing the castable elastomer in the mold to make an adhesion-inhibiting elastomeric seal insert and a top guide stem sleeve and secure them on a valve body. The valve body is subsequently separated from the mold. This method may be modified when separate first and second molds are provided for making an elastomeric seal insert in a peripheral seal retention groove and an elastomeric top guide stem sleeve respectively, the first mold comprising the peripheral seal retention groove and the second mold comprising at least a portion of the top guide stem. The modified method then allows the use of first and second castable elastomers (which may be different) for casting and curing in the first and second molds respectively to make an adhesion-inhibiting elastomeric seal insert and a top guide stem sleeve and secure them on a valve body. The valve body is subsequently separated from the first and second molds.

Provision for limited relative movement of cast-in-place elastomers in the illustrated embodiments of the present invention obviates shortcomings in past designs related to adhesively bonding or otherwise fixing cast-in-place elastomers to a valve body. Such past designs did not allow limited relative elastomer movement in response to localized dynamic compressive, bending and/or shear loads, nor did these designs account for deleterious effects of an increase in background stress as the elastomer cured and shrank away from portions of a valve body to which it was bonded or otherwise fixed. This increased background and dynamic elastomer stress shortened valve service life because it predisposed the elastomer to cracking and tearing.

The provision of adhesion-inhibiting surfaces in molds for cast-in-place elastomeric valve seals is therefore a distinguishing feature of the present invention that results in materially improved seal performance with conventional seal elastomers. For example, although the MDI polyester thermoset urethanes (comprising a monodiphenylethane polymer and about 14–16% of a diisocyanate curative) are well known seal materials, the present invention includes new and non-obvious ways to use these materials. Elastomeric valve seal inserts and guide stem sleeves cast-in-place on valve bodies according to the present invention differ materially from prior elastomers cast-in-place on valve bodies due to the inhibition of adhesion (including the absence of bonding) between the elastomer and the valve body, resulting in materially lower levels of background and dynamic stress in the cured (i.e., crosslinked) elastomer. Such stress reduction, which includes reduction of peak contact pressures, with dissipation of impact energy within the elastomer of seal inserts and guide stem sleeves, significantly extends the service life of both the seal inserts and valve stem guides.

Achievement of adhesion inhibition by treating a valve body as described herein during valve manufacture means that a cast-in-place seal insert may experience limited relative movement with respect to the peripheral seal retention groove of that valve body. Groove wall serrations that assist in retaining the seal insert in the peripheral groove during its limited relative movement should be offset as described below to minimize their effects as stress raisers for either the seal retention groove walls or the elastomer of the cast-in-place seal insert. Such serration placement minimizes valve body fatigue failures due to impact loads and bending stress. Further, serrations are designed so the seal insert elastomer experiences continued effective contact with the serrations on the groove walls notwithstanding the combined effects of elastomer shrinkage during curing and limited relative movement of the seal insert with respect to the serrations during valve operation. Such continued effective contact (i.e., interdigitation) ensures that the seal insert is retained in its peripheral groove without suffering displacement that would materially reduce its service life.

An illustrated embodiment of a top-stem-guided valve body having a cast-in-place elastomeric seal insert and a separate cast-in-place top guide stem sleeve made according to the present invention is shown in FIG. 9. The elastomeric seal insert is cast-in-place in a first mold comprising a peripheral seal retention groove of a valve body that comprises at least one such groove, while the top guide stem sleeve is cast-in-place in a second mold comprising at least a portion of the top guide stem of the valve body. An illustrated alternative embodiment of a top-stem-guided valve body having a cast-in-place elastomeric seal insert and an integral cast-in-place top guide stem sleeve made according to the present invention is shown in FIG. 10. The elastomeric seal insert and the elastomeric top guide stem sleeve are cast-in-place in a single mold comprising both a valve body's peripheral seal retention groove and the valve body's top guide stem.

In making either of these embodiments, mold surfaces coming into contact with the elastomer as a seal insert and/or a top guide stem sleeve is cast-in-place are chosen and/or prepared so as to inhibit adhesion of the elastomer to each such surface. Adhesion-inhibiting properties of a mold-elastomer interface may be obtained by appropriate choice of materials for the mold and the elastomer, and/or by subsequent treatment of these materials. For example, if a valve body is quenched in oil after heat-treatment (e.g., carburization), a thin layer of the quenching oil may be retained on the seal retention groove after quenching is completed for treating the groove to increase its adhesion-inhibiting properties. An adhesion-inhibiting seal retention groove may also be prepared, for example, by polishing the groove and/or by the applying to the groove one or more layers of non-stick materials such as oils, greases, waxes or plastics having non-stick properties analogous to those of Teflon®. In each case, according to the present invention, an elastomeric seal cast-in-place in contact with a mold having adhesion-inhibiting surfaces exhibits minimal or no adherence to such surfaces during curing. That is, forces due to adhesion of the elastomer to mold surfaces, if present, will not materially add to the elastomer's background stress and thus will not materially reduce service life through a mechanism similar to that schematically illustrated in FIG. 3.

Valve bodies of the present invention have at least one peripheral seal retention groove having opposing first and second groove walls and are symmetrical about a longitudinal axis. They are relatively stiff for their weight, and do not employ any means, such as a seal retention plate, for applying longitudinal compressive force to, and thus increasing the background elastomer stress of, a seal insert retained in the groove. Such valve bodies resist distortion about radial axes better than valve bodies of equal weight that do have seal retention plates.

First opposing groove walls on valve bodies of the present invention are closer than second opposing walls to an area of high impact loads because they are closer to a peripheral metal sealing surface on the valve body flange. Thus, the periphery of first opposing groove walls is subject to relatively higher impact stress than other parts of the opposing groove walls when the metal of the valve body contacts the metal of the valve seat.

Second opposing groove walls, while more distant from the site of maximum metal-to-metal impact stress than first opposing walls, nevertheless experience significant bending stress due to forces transmitted to them through the seal insert elastomer. This bending stress on the second opposing groove wall is lowest peripherally and highest centrally (i.e., highest in that part of the wall that is closest to the longitudinal axis of the valve body). The area of maximum bending stress on second opposing groove walls is more central than the area of maximum metal-to-metal impact stress on first opposing walls because second opposing walls are effectively cantilevered peripherally from the most centrally located area of the seal retention groove.

Because the periphery of first opposing walls sustains relatively high impact stress, serrations on first opposing groove walls are preferably located as far centrally on such groove walls as practicable to maximize the distance from the impact area and thus minimize stress build-up near the serrations (which act as stress raisers). In a valve body having a longitudinal axis of symmetry, for example, this means that serrations on first opposing walls are located as close as practicable to the longitudinal axis of symmetry (i.e., relatively centrally in the seal retention groove). On the other hand, serrations on second opposing walls are located as far as practicable from the longitudinal axis of symmetry (i.e., peripherally, relative to the centrally-placed serrations on the first opposing walls as noted above).

Serrations on first and second groove walls are thus offset. Serration offset, in turn, minimizes the detrimental stress-raising effects of the serrations on their respective valve body flange areas. Additionally, use of offset serrations means that retaining forces exerted on an elastomeric seal in a groove by serrations on the opposing groove walls are further spaced apart as a function of the offset distance. This further spacing apart adds to the separation of forces acting on the seal insert and thus tends to allow limited relative movement of the seal insert with respect to the groove walls without excessive elastomer stress.

Thus, the offset serrations in a seal retention groove of the present invention act to reduce the likelihood of fatigue failures in valve body flanges, and they simultaneously reduce stress concentration in the elastomer of a seal in the groove. The latter benefit may be further increased if spacing between the respective flange areas that form the opposing walls of a peripheral seal retention groove increases as a function of increasing distance from the valve body longitudinal axis. Spacing between seal retention groove walls is determined in part by industry standards but may diverge peripherally in valve bodies of the present invention to obtain additional elastomer stress relief.

In preferred embodiments of the present invention, provision is made for escape of air bubbles that may be present during casting of an elastomeric seal insert and/or an elastomeric guide stem sleeve in a mold comprising portions of a valve body when the longitudinal axis of the valve body is in the vertical orientation. For casting of a guide stem sleeve, escape of the air bubbles is facilitated by the presence of a superior chamfered wall on any guide stem undercut that may be present. For casting of a seal insert in a seal retention groove, escape of the air bubbles is facilitated if the groove width increases as a function of increasing distance from the valve body longitudinal axis. A desirable amount of groove width increase with increasing distance from the valve body longitudinal axis may be specified in terms of the included angle measured between straight (or nearly straight) portions of seal retention groove walls. The preferred range of these included angles for the present invention is about 10 to 60 degrees, depending on the particular valve body design.

Note that curvature of groove walls toward the center of the groove is allowable if the resulting curved wall would not trap air bubbles in liquid elastomer when the valve body is in position for casting of a seal in the groove. Included angle measurements for any curved portion of the groove wall are preferably made using the chord of any such curved portion.

DETAILED DESCRIPTION OF PREFERRED EMBODIMENTS

Figure 1:
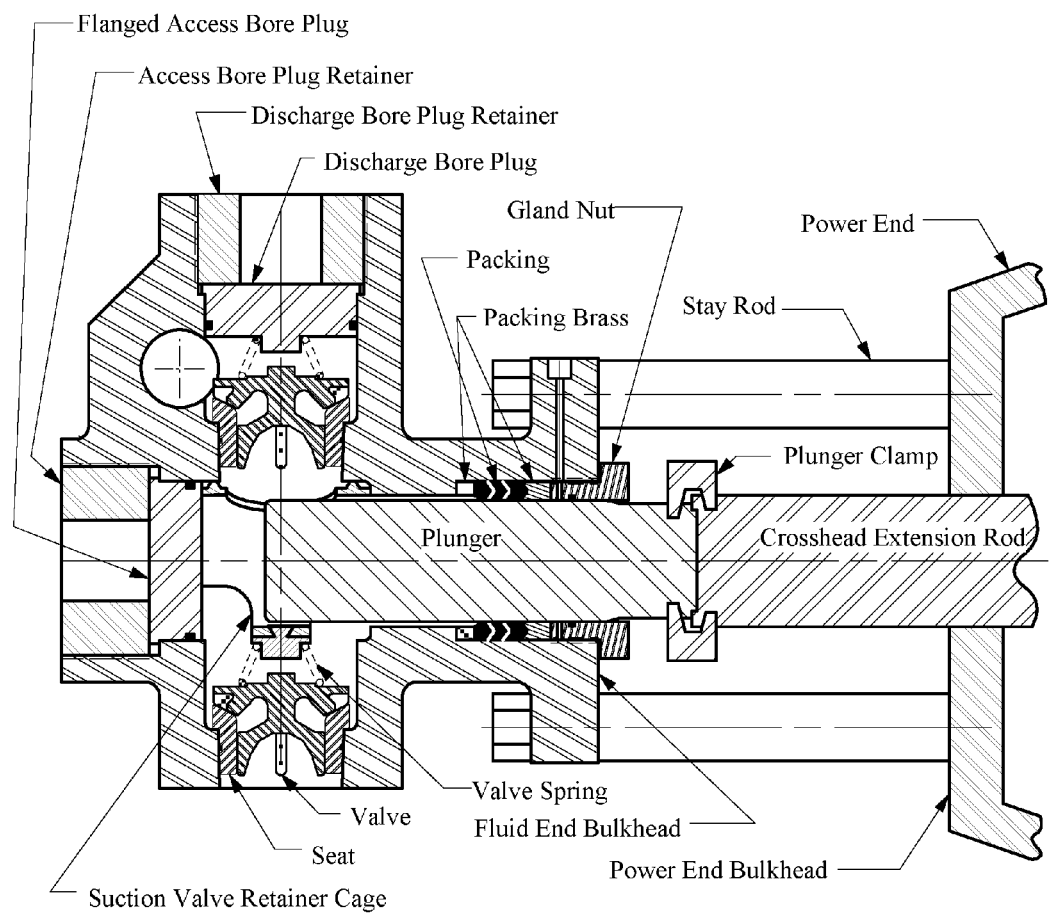
FIG. 1 is a cross-sectional schematic view of a typical plunger pump fluid section showing its connection to a power section by stay rods.
Figure 2:
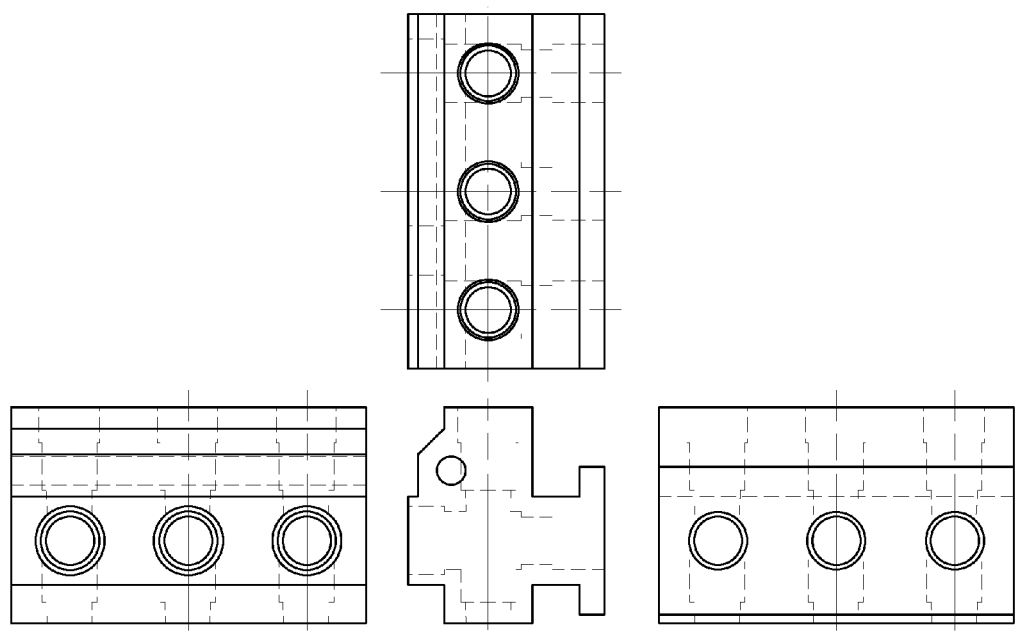
FIG. 2 schematically illustrates a conventional Triplex plunger pump fluid section housing.
Figure 3:
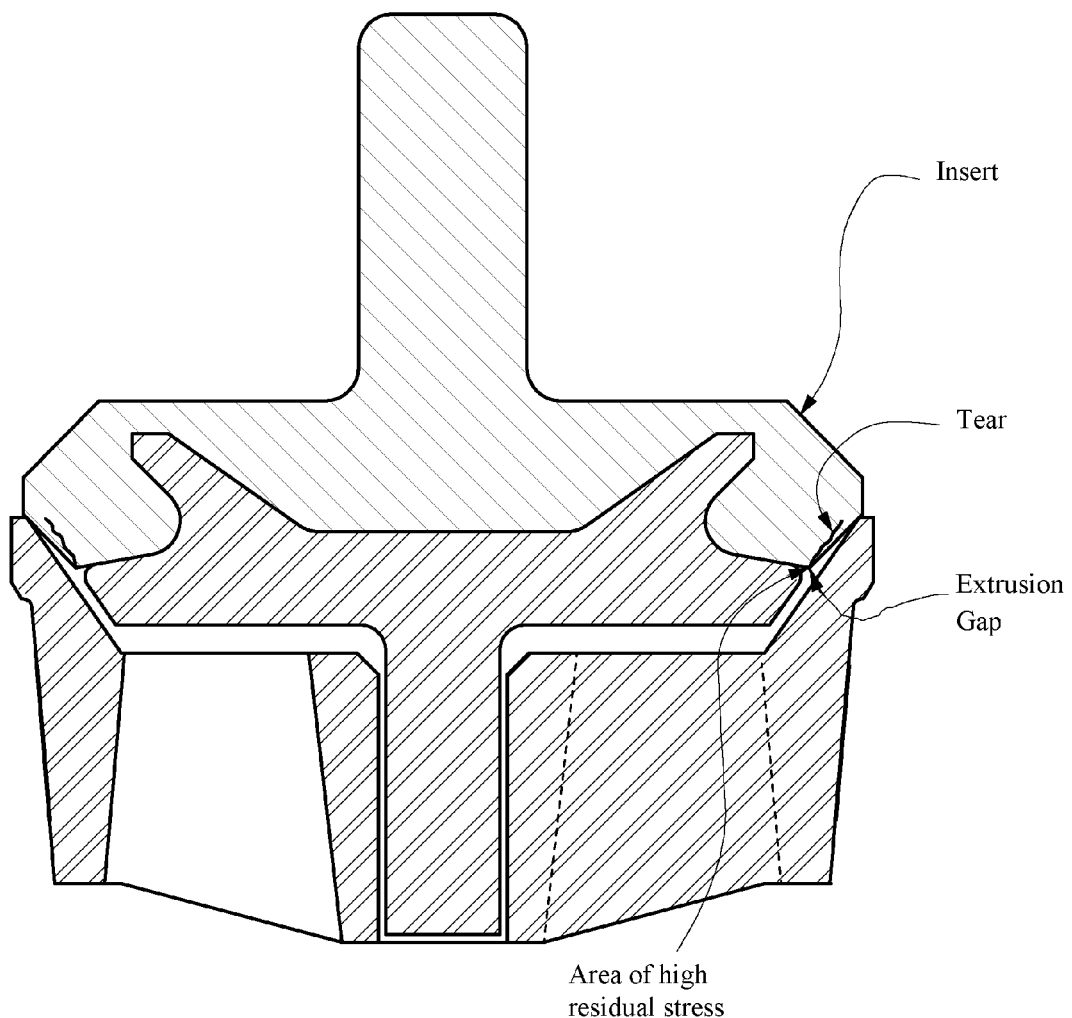
FIG. 3 schematically illustrates a partial cross-section of a web valve seat and a corresponding stem-guided valve body showing areas of common failure modes of cast-in-place elastomeric seals that are bonded to a valve body.
Figure 4A:
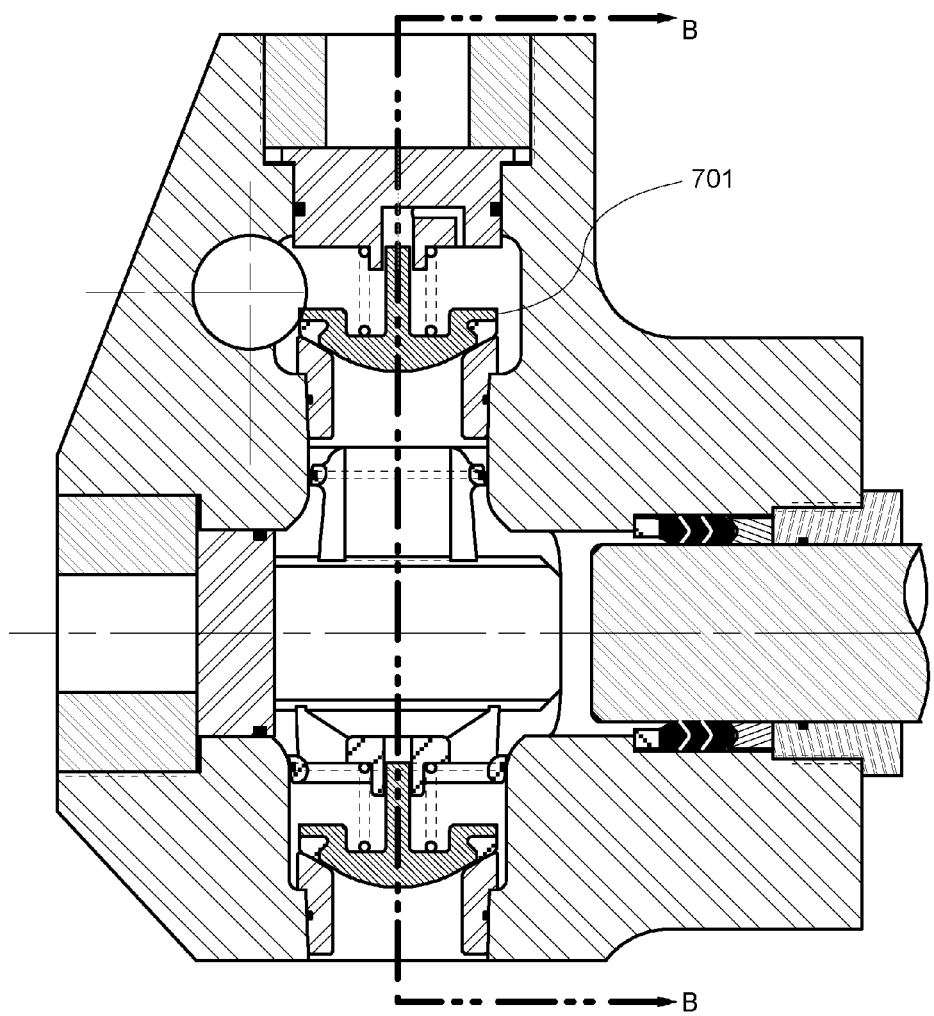
FIG. 4A schematically illustrates a cross-section of a plunger pump that includes a top-stem-guided suction valve and a top-stem-guided discharge valve.
Figure 4B:
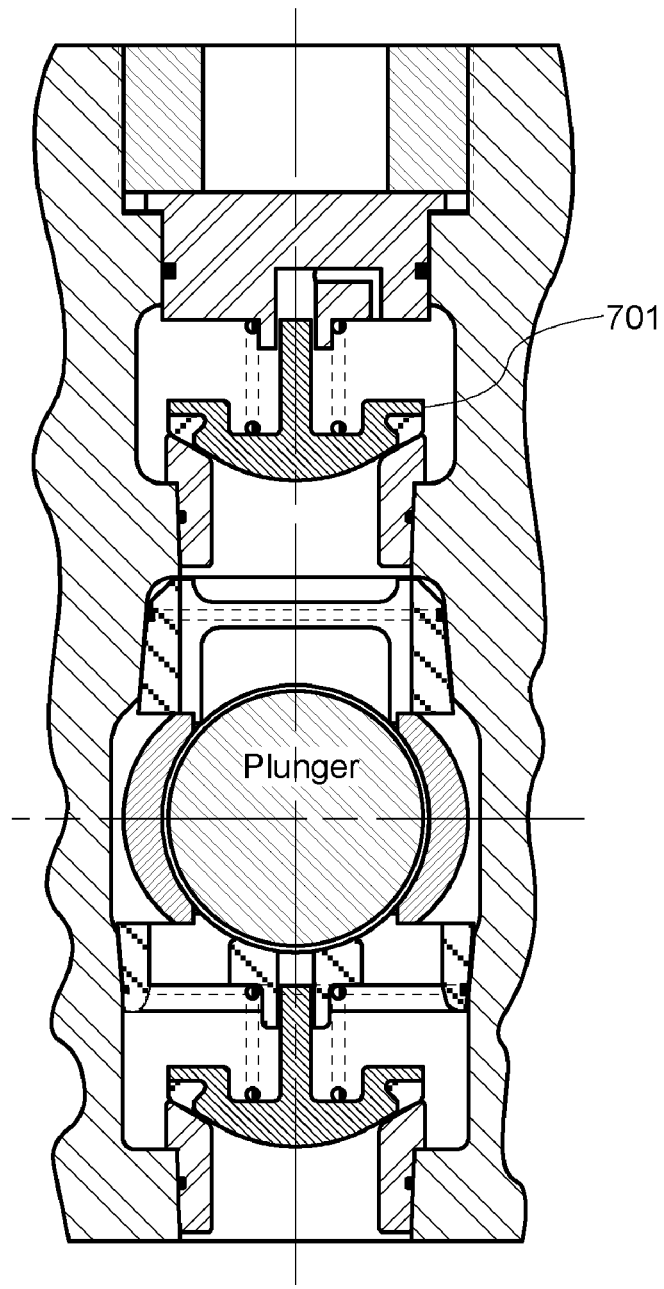
FIG. 4B schematically illustrates the sectional view labeled B—B in FIG. 4A.
Figure 5:
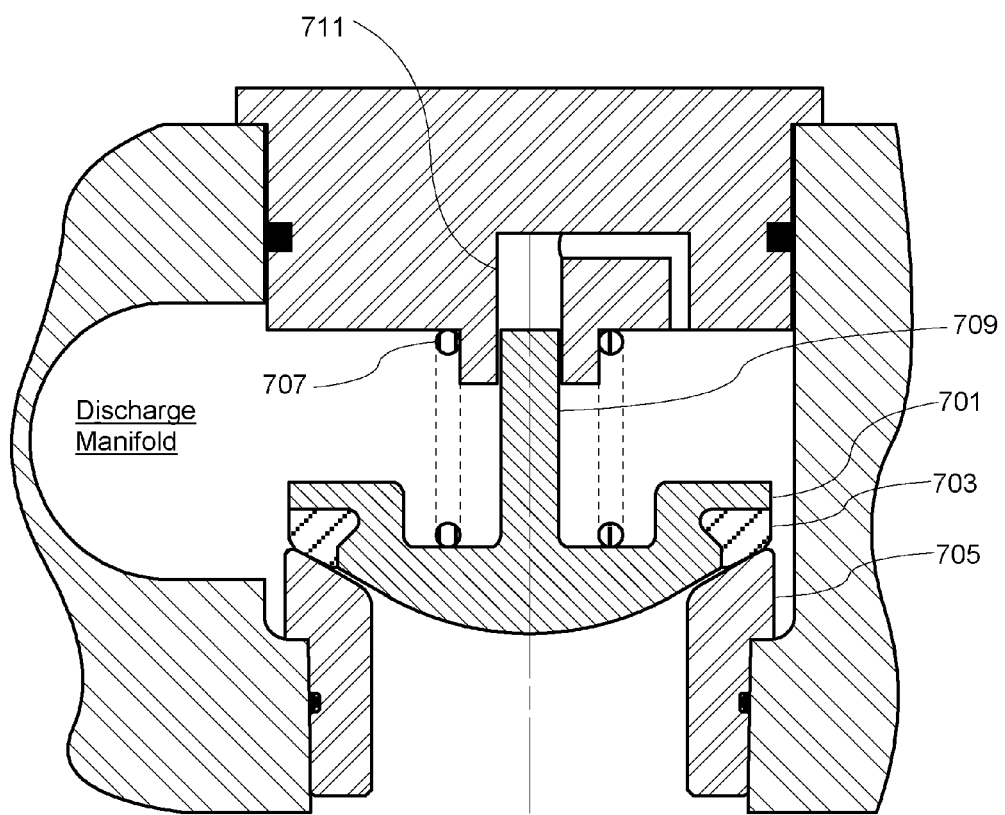
FIG. 5 is a partial cross-section schematically illustrating detail of the top-stem-guided discharge valve of FIGS. 4A and 4B.
Figure 6:
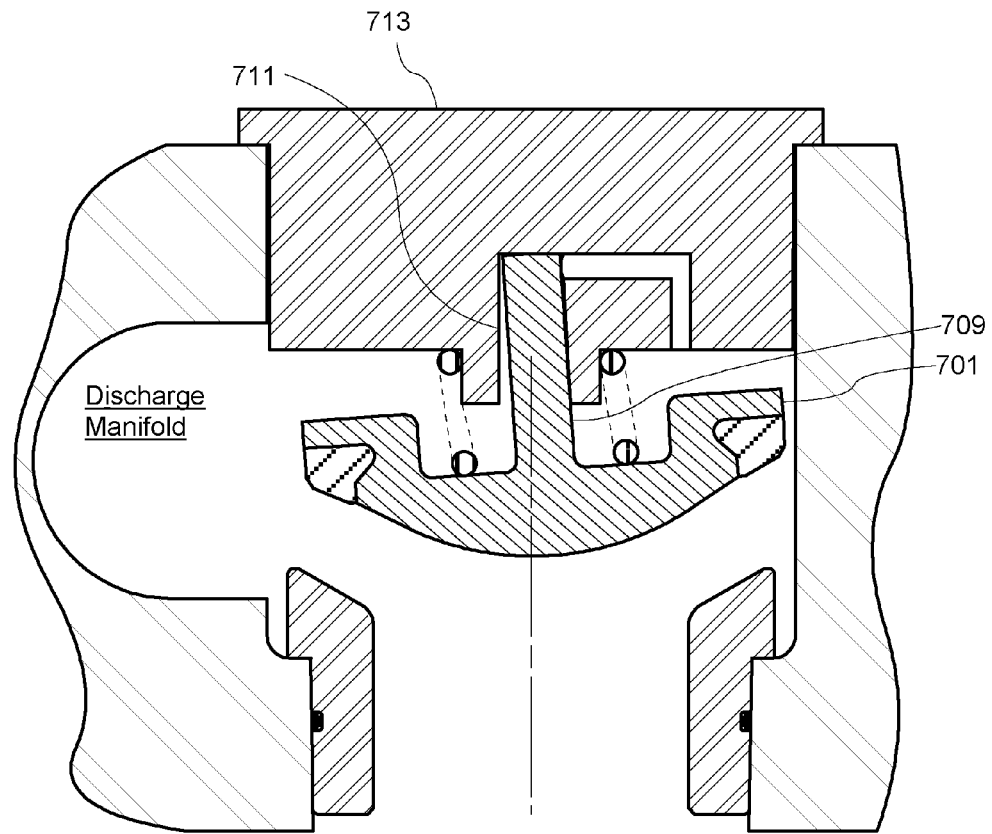
FIG. 6 schematically illustrates misalignment of the top guide stem of the discharge valve of FIG. 5.
Figure 7:
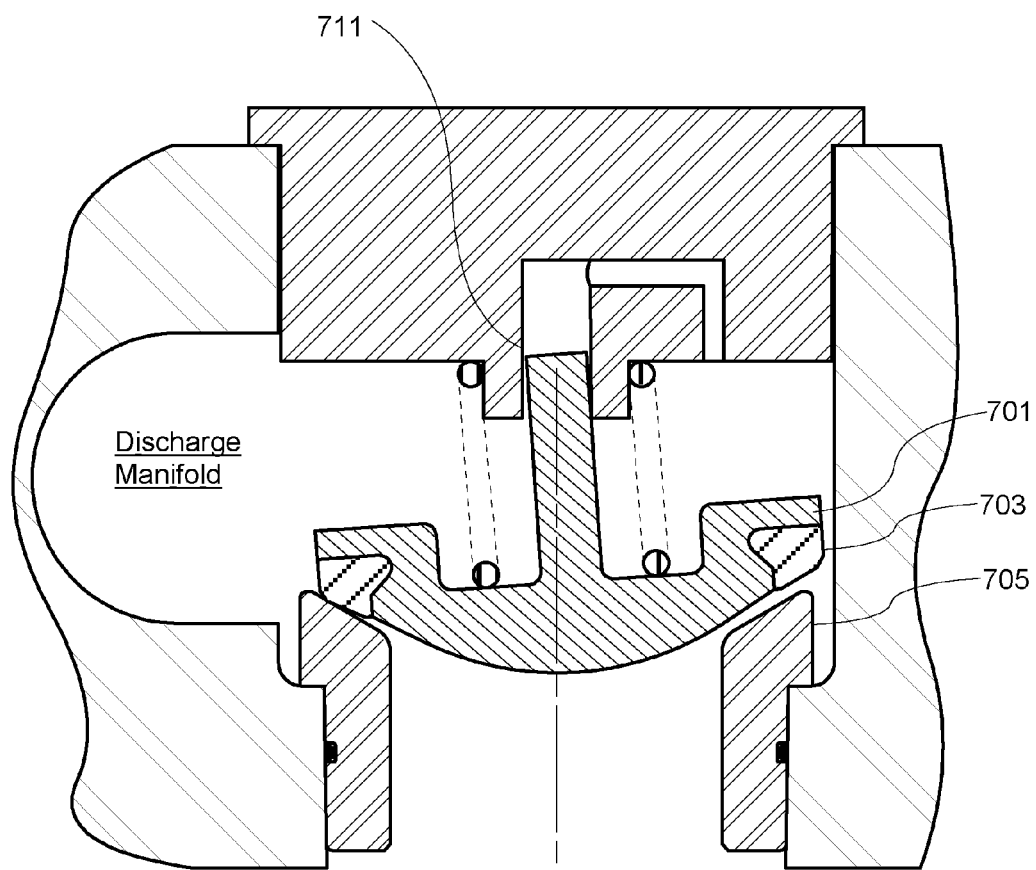
FIG. 7 schematically illustrates improper closure of the discharge valve of FIG. 6 due to misalignment of the top guide stem.
Figure 8:
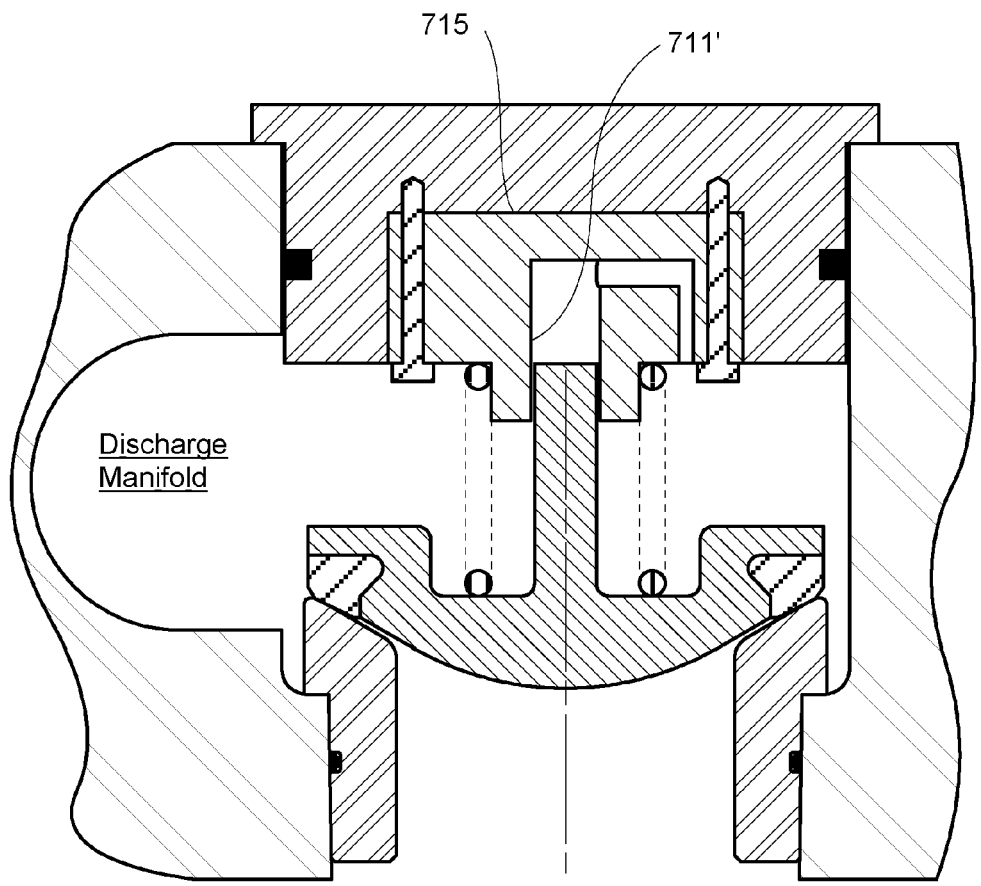
FIG. 8 schematically illustrates a replaceable bushing in a modification of the top valve stem guide shown in FIG. 7.
Figure 9:
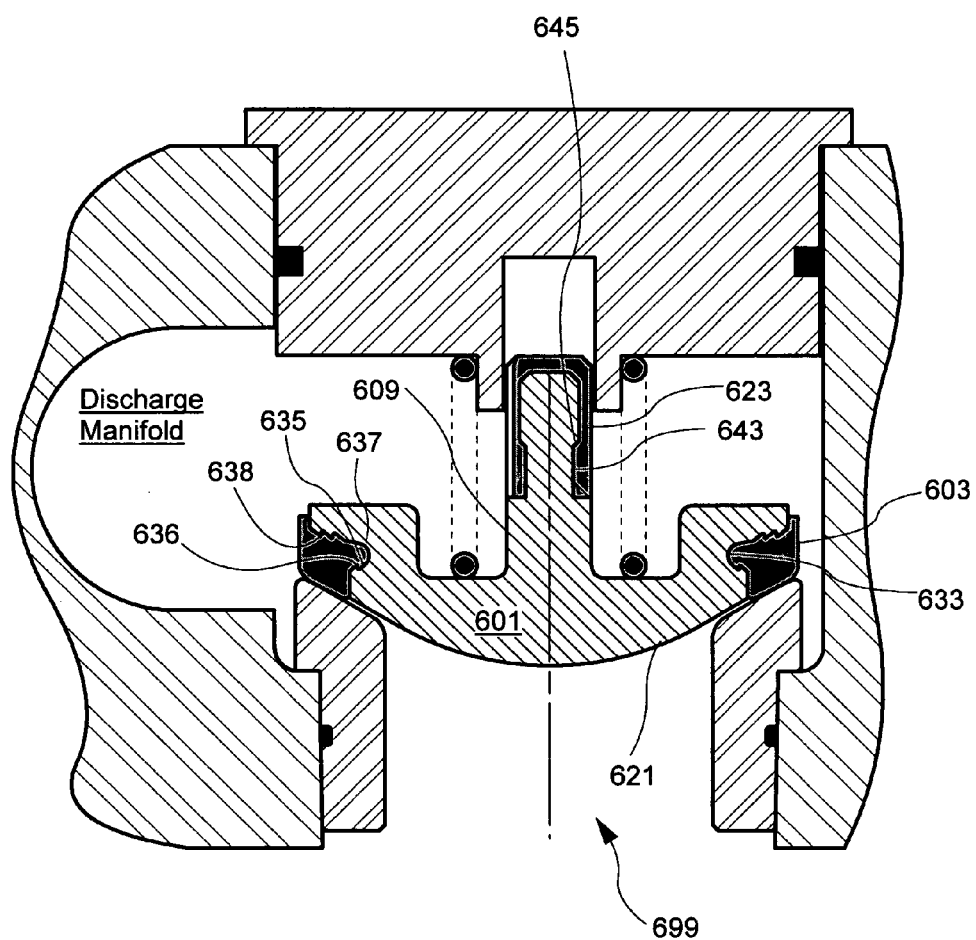
FIG. 9 schematically illustrates an embodiment of a top-stem-guided valve body having a cast-in-place elastomeric seal insert and a separate cast-in-place top guide stem sleeve made according to the present invention.

FIG. 9 schematically illustrates an embodiment of a valve body and seal assembly 699 comprising a top-stem-guided valve body 601 having a cast-in-place elastomeric seal insert 603 and a separate cast-in-place top guide stem sleeve 623 secured to valve body 601 according to a method of the present invention. Elastomeric seal insert 603 is cast-in-place in a peripheral seal retention groove 633 having first and second opposing groove sides 635 and 637 respectively, while guide stem sleeve 623 is cast-in-place on top guide stem 609. Note that the illustrated embodiment of top guide stem 609 comprises an undercut 643 having a chamfered superior wall 645 for further securing guide stem sleeve 623 to top guide stem 609 while allowing limited relative movement of guide stem sleeve 623 with respect to top guide stem 609. Guide stem sleeve 623 is additionally secured to top guide stem 609 by an ambient pressure greater than zero because the close fit of guide stem sleeve 623 on top guide stem 609 does not admit air or liquid between them.

Figure 11:
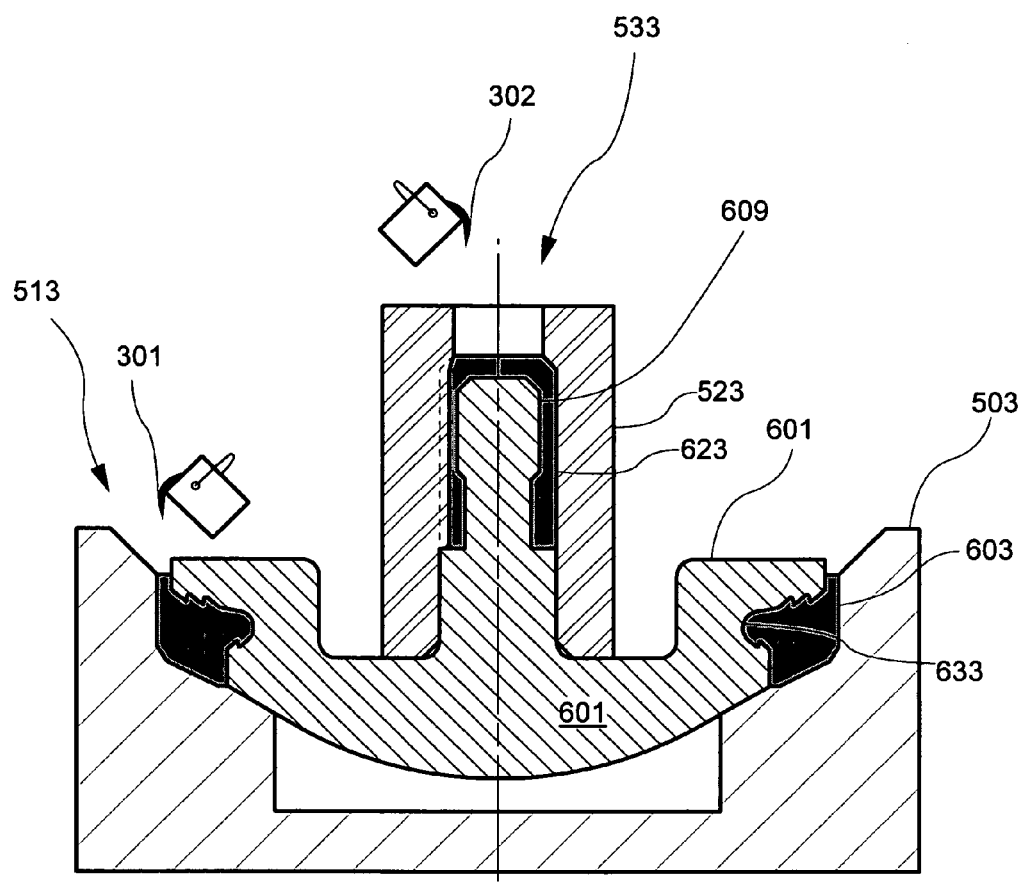
FIG. 11 schematically illustrates a cross-section showing a top-stem-guided valve body and a first mold shell for casting-in-place an elastomeric seal insert in the valve body's peripheral seal retention groove, together with a second mold shell for casting-in-place a sleeve on the valve body's top guide stem, the seal retention groove, the top guide stem, and the first and second mold shells comprising adhesion-inhibiting surfaces.

The method of securing a peripheral elastomeric seal insert 603 and a top guide stem sleeve 623 on valve body 601 of the illustrated embodiment comprises providing circular serrations 636 on first opposing groove side 635 and circular serrations 638 on second opposing groove side 637. FIG. 11 schematically shows that a first mold 513 is provided comprising the peripheral seal retention groove 633, and a second mold 533 is provided comprising at least a portion of the top guide stem 609. At least one castable elastomer is chosen that will not adhere to first mold 513 or second mold 533. In the illustrated embodiment of FIG. 11, castable elastomer 301 is cast and cured in first mold 513 to secure peripheral elastomeric seal insert 603 on valve body 601, while a different castable elastomer 302 is cast and cured in second mold 533 to secure top guide stem sleeve 623 on valve body 601. Valve body 601 is then separated from first mold 513 and second mold 533. Note that castable elastomer 301 may be chosen to have one or more properties (e.g., greater compliance) different from those of castable elastomer 302 because of the different stresses to which peripheral seal inserts and guide stem sleeves are exposed in use.

Figure 12:
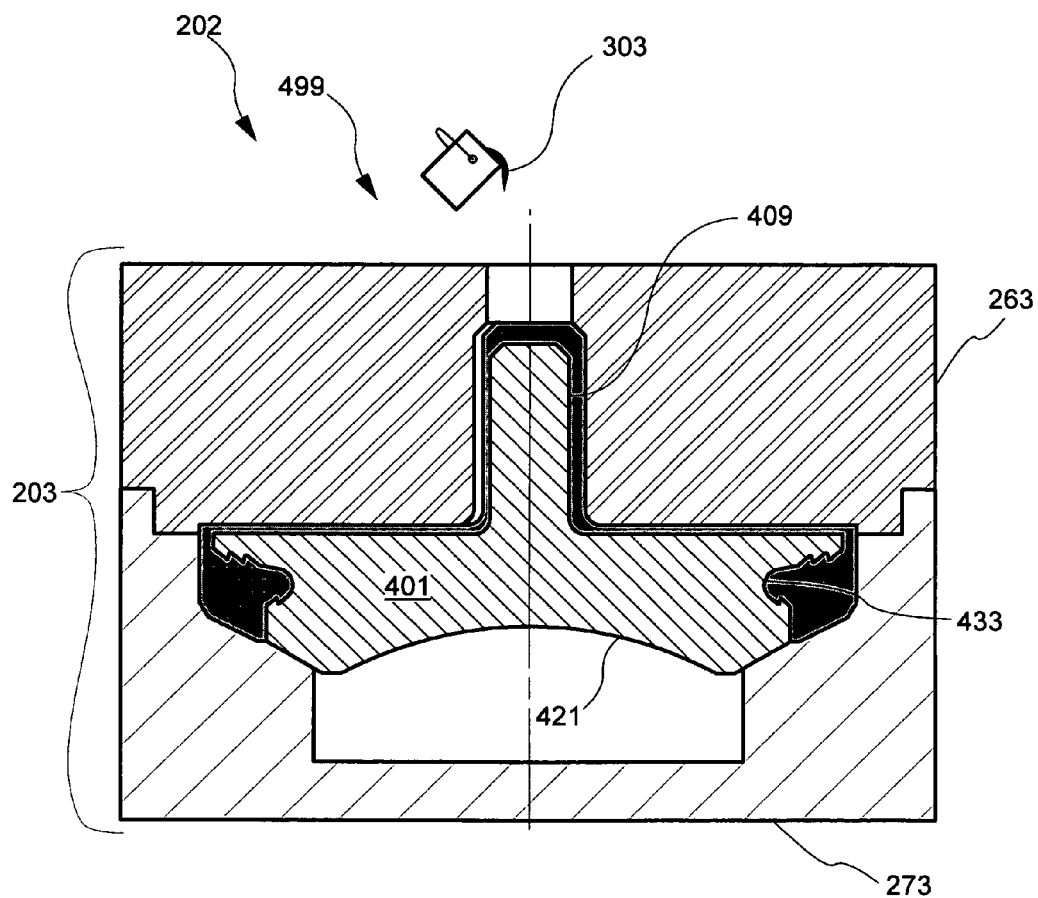
FIG. 12 schematically illustrates a cross-section showing a top-stem-guided valve body and a mold shell for casting-in-place an elastomeric seal insert in the valve body's peripheral seal retention groove and an integral sleeve on the valve body's top guide stem, the seal retention groove, the top guide stem, and the mold shell comprising adhesion-inhibiting surfaces.

A cast-in-place elastomer seal insert 603 and guide stem sleeve 623 secured to a valve body 601 as described above experience relatively lower stress due to limited relative movement between the valve body 601 and the elastomer(s) in use. An alternative method of making a valve body and seal assembly 499 (see FIG. 10) comprises providing a liquid elastomer 303 (see FIG. 12) and a valve body 401 on which the elastomer is cast-in-place. The valve body 401 has a longitudinal axis and comprises a peripheral seal retention groove 433 spaced apart from the longitudinal axis. Note that valve body 401 comprises a partially concave lower surface 421, in contrast to the convex lower surface 621 of valve body 601 (see FIG. 9). Concave lower surface 421 facilitates reducing the mass of valve body 401 without significant loss of valve body strength.

Figure 10:
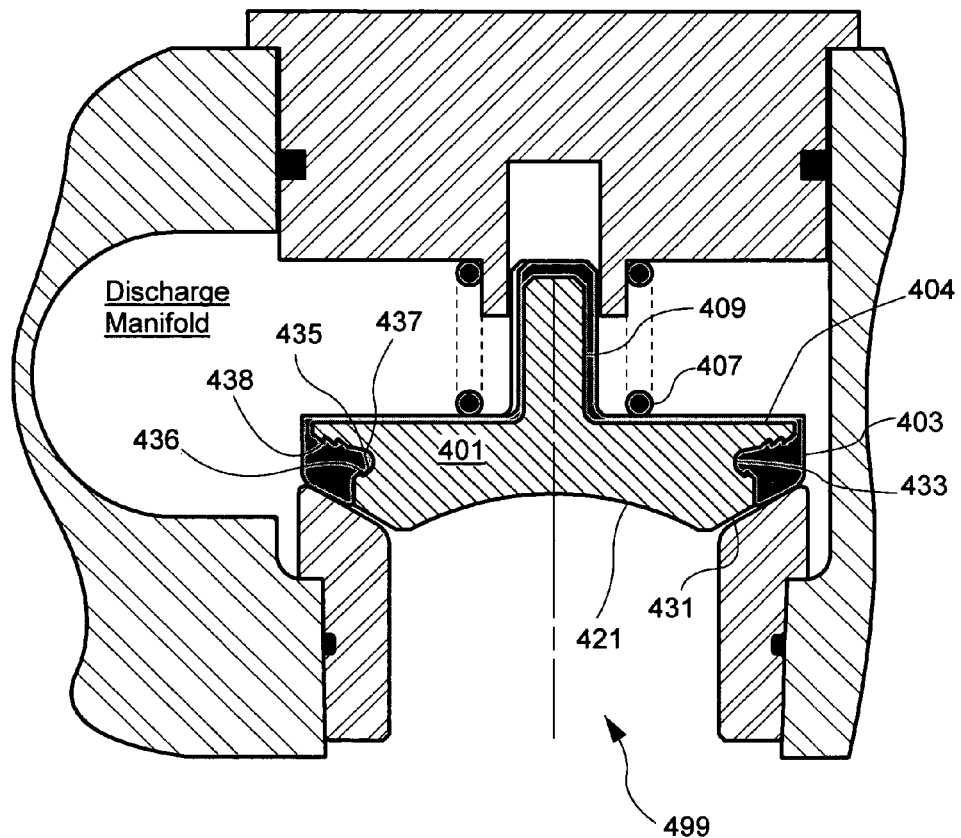
FIG. 10 schematically illustrates an embodiment of a top-stem-guided valve body having a cast-in-place elastomeric seal insert and an integral cast-in-place top guide stem sleeve made according to the present invention.

Referring to FIG. 10, seal retention groove 433 has first and second opposing sides 435 and 437 respectively, opposing sides 435 and 437 being separated by a groove width. A top guide stem 409 extends away from peripheral seal retention groove 433 along the longitudinal axis, and an impact area 431 of the valve body for contacting a valve seat is proximate to the first opposing side 435 of the peripheral seal retention groove 433. There are circular serrations 436 on first opposing side 435 and circular serrations 438 on second opposing side 437 of peripheral seal retention groove 433. The method includes treating peripheral seal retention groove 433 and top stem guide 409 to render peripheral seal retention groove 433 and top stem guide 409 adhesion-inhibiting. Optionally, treating top surface 404 of valve body 401 to render it adhesion-inhibiting may be included in the method, but such treatment may be eliminated because elastomer overlying top surface 404 is locally compressed by valve spring 407. A mold 202 is provided for containing liquid elastomer 303, mold 202 comprising mold shell 203 (shown in FIG. 12 as comprising upper mold shell section 263 and lower mold shell section 273) mated with valve body 401. The mold 202 comprises the adhesion-inhibiting peripheral seal retention groove 433 and the adhesion-inhibiting top guide stem 409 for making a valve body and seal assembly having an elastomeric seal insert in a peripheral seal retention groove integral with an elastomeric top guide stem sleeve on a top guide stem. Liquid elastomer 303 is poured into mold 202 and cured in mold 202 to achieve a cross-linked elastomer, after which mold shell 203 is removed to make a valve body and seal assembly 499.

Note that in alternative embodiments, mold 202 can be replaced by two separate molds such as mold 513 and mold 533 (see FIG. 11) for making a valve body and seal assembly having an elastomeric seal insert in a peripheral seal retention groove separate from an elastomeric top guide stem sleeve on a top guide stem. FIG. 11 shows that mold 513 comprises mold shell 503 and adhesion-inhibiting peripheral seal retention groove 633, while mold 533 comprises mold shell 523 and at least a portion of adhesion-inhibiting top guide stem 609. Liquid elastomer 301 is poured into mold 513 and cured in mold 513 to achieve a cross-linked elastomeric seal insert, and liquid elastomer 302 is poured into mold 533 and cured in mold 533 to achieve a cross-linked elastomeric top guide stem sleeve. Then mold shell 503 and mold shell 523 are removed to make a valve body and seal assembly 699.

Figure 13A:
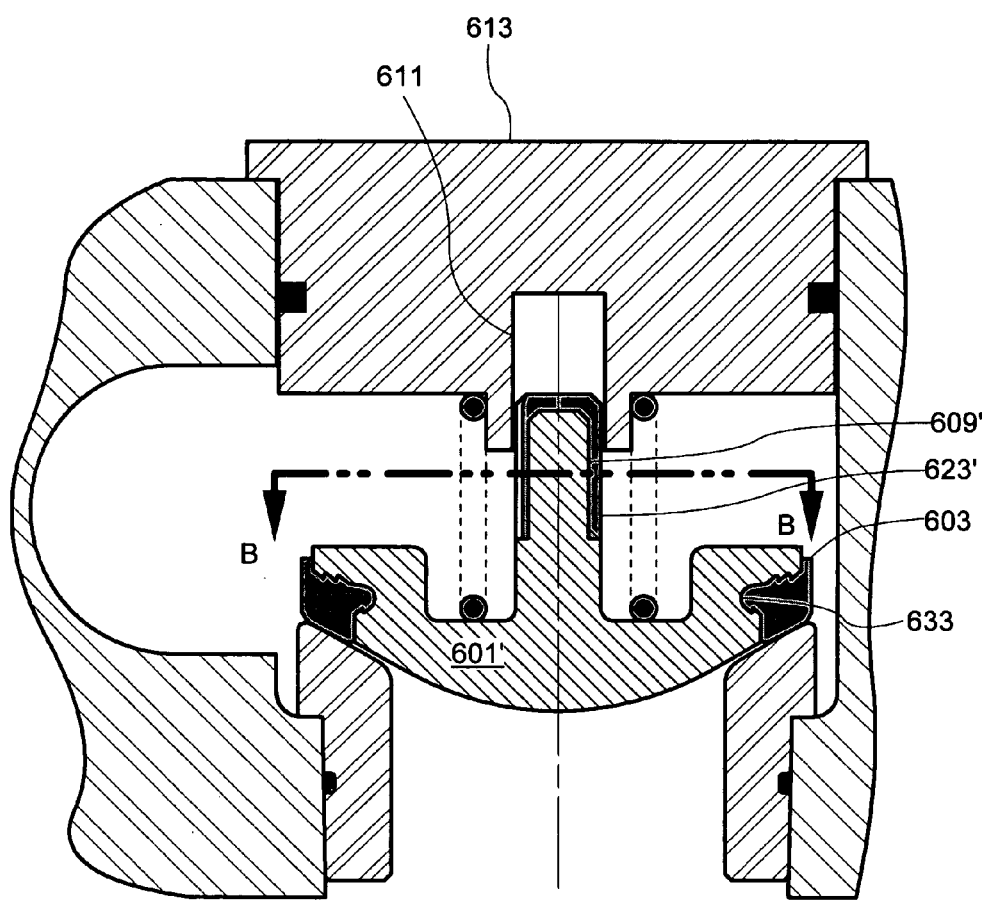
FIG. 13A schematically illustrates a partial cross-section showing detail of a top-stem-guided discharge valve body in a plunger pump, the valve body having a cast-in-place elastomeric seal insert in a peripheral seal retention groove and a cast-in-place sleeve on the top guide stem.
Figure 13B:
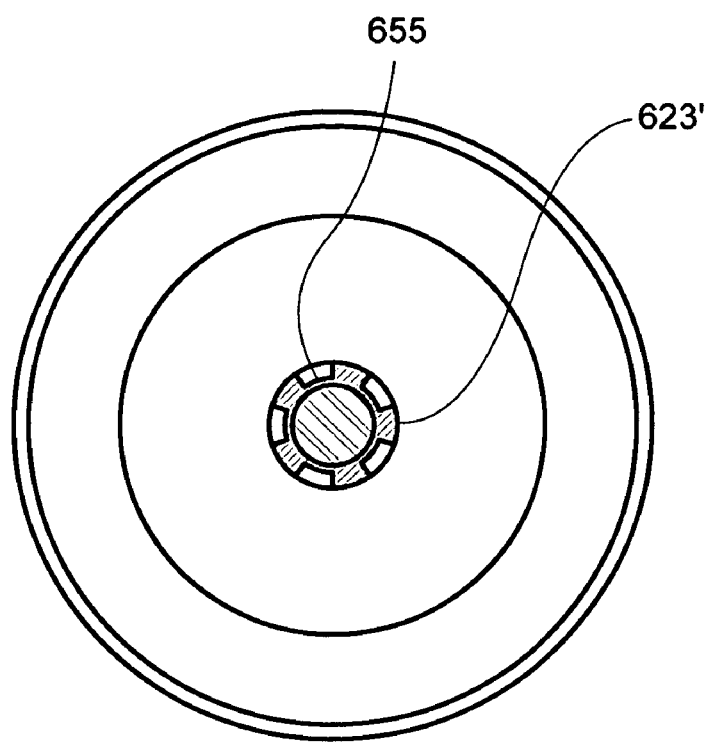
FIG. 13B schematically illustrates the partial cross-section B—B indicated in FIG. 13A, cross-section B—B showing longitudinal fluid flow channels in the top guide stem sleeve.

FIG. 13A schematically illustrates a partial cross-section showing detail of a top-stem-guided discharge valve body 601' in a plunger pump. Valve body 601' has a cast-in-place elastomeric seal insert 603 in a peripheral seal retention groove 633 and a cast-in-place sleeve 623' on the top guide stem 609'. Note that top guide stem 609 (see FIG. 9) comprises an undercut 643, whereas top guide stem 609' in FIG. 13 has no undercut. Cast-in-place sleeve 623' is secured on top guide stem 609' by ambient pressure greater than zero as described above. FIG. 13B schematically illustrates the partial cross-section B—B indicated in FIG. 13A, cross-section B—B showing longitudinal fluid flow channels 655 molded into top guide stem sleeve 623'. At least one longitudinal fluid flow channel 655 allows escape of fluid that may be present in top stem guide 611 as top guide stem 609' within top guide stem sleeve 623' advances into top stem guide 611 within discharge bore plug 613. Note that longitudinal fluid flow channels need not be straight as schematically illustrated herein, but may instead have a curved (e.g., spiral or helical) shape, as long as the channel(s) allow longitudinal fluid flow (i.e., the escape of fluid from the top stem guide as described above).

What is claimed is:

1. A method of making a valve body and seal assembly, the method comprising:
    providing a liquid elastomer;
    providing a valve body having a longitudinal axis and comprising:
        a peripheral seal retention groove spaced apart from said longitudinal axis, said seal retention groove having first and second opposing sides, said opposing sides being separated by a groove width;
        a top guide stem extending away from said peripheral seal retention groove along said longitudinal axis;
        an impact area of said valve body for contacting a valve seat, said impact area being proximate to said first opposing side of said peripheral seal retention groove; and
        circular serrations on said first and second opposing sides of said peripheral seal retention groove;
    treating said peripheral seal retention groove and said top stem guide to render said peripheral seal retention groove and said top guide stem adhesion-inhibiting;
    providing a mold for containing said liquid elastomer, said mold comprising an adhesion-inhibiting mold shell mated with said valve body, said mold comprising said adhesion-inhibiting peripheral seal retention groove and said adhesion-inhibiting top guide stem;
    pouring said liquid elastomer into said mold;
    curing said poured elastomer in said mold; and
    removing said mold shell to make a valve body and seal assembly.

2. The method of claim 1 wherein said circular serrations are offset.

3. The method of claim 2 wherein said liquid elastomer comprises MDI urethane.

4. The method of claim 1 wherein said treating step comprises applying oil to said valve body and retaining a thin coating of said oil on said seal retention groove and said top guide stem.

5. A valve body and seal assembly made according to the method of claim 1.

6. A valve body and seal assembly made according to the method of claim 3.

7. The method of claim 1 wherein said mold comprises at least one longitudinal fluid flow channel.

8. The method of claim 7 wherein at least one said longitudinal fluid flow channel is spiral shaped.

9. A method of securing an elastomeric seal and a top guide stem sleeve on a valve body comprising a top guide stem and a peripheral seal retention groove having first and second opposing sides, the method comprising:
  providing circular serrations on said first and second opposing groove sides;
  providing a mold comprising the peripheral seal retention groove and the top guide stem;
  choosing a castable elastomer that will not adhere to said mold;
  casting and curing said castable elastomer in said mold; and
  separating said valve body from said mold.

10. The method of claim 9 wherein said castable elastomer comprises MDI urethane.

11. A method of securing a peripheral elastomeric seal and a top guide stem sleeve on a valve body comprising a top guide stem and a peripheral seal retention groove having first and second opposing sides, the method comprising:
  providing circular serrations on said first and second opposing groove sides;
  providing a first mold comprising the peripheral seal retention groove;
  providing a second mold comprising at least a portion of the top guide stem;
  choosing at least one castable elastomer that will not adhere to said first mold or said second mold;
  casting and curing one said castable elastomer in said first mold to secure a peripheral elastomeric seal on the valve body;
  casting and curing one said castable elastomer in said second mold to secure a top guide stem sleeve on the valve body; and
  separating said valve body from said first mold and from said second mold.

12. The method of claim 11 wherein at least one said castable elastomer comprises MDI urethane.

13. A method of making a valve body and seal assembly, the method comprising:
  providing at least one liquid elastomer;
  providing a valve body having a longitudinal axis and comprising:
    a peripheral seal retention groove spaced apart from said longitudinal axis, said seal retention groove having first and second opposing sides, said opposing sides being separated by a groove width;
    a top guide stem extending away from said peripheral seal retention groove along said longitudinal axis;
    an impact area of said valve body for contacting a valve seat, said impact area being proximate to said first opposing side of said peripheral seal retention groove; and
    circular serrations on said first and second opposing sides of said peripheral seal retention groove;
  treating said peripheral seal retention groove and said top stem guide to render said peripheral seal retention groove and said top guide stem adhesion-inhibiting;
  providing a first mold for containing said liquid elastomer, said first mold comprising a first adhesion-inhibiting mold shell mated with said valve body, said first mold comprising said adhesion-inhibiting peripheral seal retention groove;
  providing a second mold for containing said liquid elastomer, said second mold comprising a second adhesion-inhibiting mold shell mated with said valve body, said second mold comprising at least a portion of said adhesion-inhibiting top guide stem;
  pouring one said liquid elastomer into said first mold;
  pouring one said liquid elastomer into said second mold;
  curing said poured elastomer in said first mold;
  curing said poured elastomer in said second mold;
  removing said first mold shell; and
  removing said second mold shell to make a valve body and seal assembly.

14. The method of claim 13 wherein said circular serrations are offset.

15. The method of claim 14 wherein said liquid elastomer comprises MDI urethane.

16. The method of claim 13 wherein said treating step comprises applying oil to said valve body and retaining a thin coating of said oil on said seal retention groove and said top guide stem.

17. A valve body and seal assembly made according to the method of claim 13.

18. The method of claim 13 wherein said second mold comprises at least one longitudinal fluid flow channel.

19. The method of claim 18 wherein at least one said longitudinal fluid flow channel is spiral shaped.

* * * * *